(12) United States Patent
Zeller et al.

(10) Patent No.: US 8,862,382 B2
(45) Date of Patent: Oct. 14, 2014

(54) COLLISION MONITORING FOR A MOTOR VEHICLE

(75) Inventors: Joerg Zeller, Stuttgart (DE); Nico Latsch, Oppenweiler (DE); Mike Schliemann, Schwieberdingen (DE); Florian Kloss, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 13/504,871

(22) PCT Filed: Oct. 12, 2010

(86) PCT No.: PCT/EP2010/065259
§ 371 (c)(1),
(2), (4) Date: Jul. 12, 2012

(87) PCT Pub. No.: WO2011/051101
PCT Pub. Date: May 5, 2011

(65) Prior Publication Data
US 2012/0277989 A1    Nov. 1, 2012

(30) Foreign Application Priority Data

Oct. 30, 2009  (DE) .......................... 10 2009 046 230

(51) Int. Cl.
*G08G 1/16*    (2006.01)

(52) U.S. Cl.
CPC . *G08G 1/16* (2013.01); *G08G 1/168* (2013.01)
USPC ........................................................ 701/301

(58) Field of Classification Search
USPC .......... 701/300–302, 96; 340/425.5, 435–436
See application file for complete search history.

(56) References Cited

U.S. PATENT DOCUMENTS

| | | | | |
|---|---|---|---|---|
| 6,405,132 | B1 * | 6/2002 | Breed et al. | 701/301 |
| 2002/0198632 | A1 * | 12/2002 | Breed et al. | 701/1 |
| 2003/0004644 | A1 * | 1/2003 | Farmer | 701/301 |
| 2005/0134440 | A1 * | 6/2005 | Breed | 340/435 |

FOREIGN PATENT DOCUMENTS

| | | |
|---|---|---|
| DE | 10 2006 002 232 | 7/2007 |
| DE | 10 2007 030 769 | 1/2009 |
| EP | 1 703 482 | 9/2006 |

* cited by examiner

*Primary Examiner* — Yonel Beaulieu
(74) *Attorney, Agent, or Firm* — Kenyon & Kenyon LLP

(57) ABSTRACT

A method for collision monitoring for a motor vehicle, in which a surrounding area is monitored, including: providing a reference state for at least one first object situated in the surrounding area, as reference object in a first stop operation, the reference state including reference position data of the at least one first object; in a second stop operation, determining whether the motor vehicle has traveled a predefined minimum distance between the first and second stop operations, and/or whether a predefined minimum time has elapsed; if it is determined that the motor vehicle has traveled a distance that is greater than the predefined minimum distance between the first and second stop operations, and/or that a time that is greater than the predefined minimum time has elapsed, the reference state is updated with position data of at least one second object situated in the surrounding area, as reference object; if subsequent drive-off is intended, determining actual position data of the at least one second object as actual state; and detecting a potential collision when the actual state and the reference state indicate a distance of more than a predefined value.

9 Claims, 2 Drawing Sheets

COLLISION MONITORING FOR A MOTOR VEHICLE

FIELD OF THE INVENTION

The present invention relates to a method and a device for collision monitoring for motor vehicles, in which an area surrounding the motor vehicle is monitored with the aid of object sensors.

BACKGROUND INFORMATION

Laid-open document DE 10 2006 002 232 A1, discusses a method and a device for collision monitoring in a vehicle, in which position information of objects situated in the surrounding area first is generated as reference state at each stop of the vehicle. At regular time intervals or in response to specific events, such as a drive-off intention of the driver, additional position data are determined as actual states. If a comparison of the particular actual state to the reference state indicates that at least one object has come closer to the motor vehicle, a potential collision is detected and a warning signal is output to the driver.

If a driver is moving his or her vehicle only across a very short distance (e.g., only a few centimeters when maneuvering in a parking space), then this known method generates a new reference state during a new stop. In the event that persons have moved into the surrounding area during the maneuvering, for example, they are classified as reference objects at a new standstill.

This method has the disadvantage that in such a case the driver himself had no opportunity to view all objects situated within the surrounding area prior to stopping because when the driving distance amounts only to a few centimeters, he is unable to view the blind region directly behind his motor vehicle (or, depending on the type of vehicle, also the region directly in front of and/or to the side of the motor vehicle) for the entire driving distance. That is to say, the fact that additional objects have now appeared in the surrounding area is initially not brought to the driver's attention.

Only when, following the determination of the reference state, these persons come even closer to the motor vehicle in the further course will the driver be warned of a potential collision. At this point in time, however, it may be difficult for the driver to assess this warning because he does not expect to encounter objects in the reference state determined at the renewed standstill that were not visible to him due to the fact that they moved into the surrounding area only during the maneuvering operation.

SUMMARY OF THE INVENTION

It is an object of the exemplary embodiments and/or exemplary methods of the present invention to provide a method for collision monitoring for a motor vehicle which gives the driver of a motor vehicle an improved warning of objects located in the surrounding area.

This objective may be achieved by the method, device, and computer program as described herein.

Additional further developments of the exemplary embodiments and/or exemplary methods of the present invention are further described herein.

According to a first aspect, a method is provided for collision monitoring for a motor vehicle, in which a surrounding area is monitored. The method includes:
  providing a reference state for at least one first object situated in the surrounding area as reference object in a first stop operation, the reference state including reference position data of the at least one first object;
  in a subsequent second stop operation, determining whether the motor vehicle has traveled a predefined minimum distance between the first stop operation and the second stop operation, and/or whether a predefined minimum time has elapsed;
  if it is determined that the motor vehicle has traveled a distance that is greater than the predefined minimum distance between the first and the second stop operation, and/or that a time that is greater than the predefined minimum time has elapsed, the reference state is updated with position data of at least one second object situated in the surrounding area as reference object;
  when a drive-off is intended subsequently, determining actual position data of the at least one second object as actual state; and
  detecting a potential collision if the actual state and the reference state indicate a distance of more than a predefined value.

Since a reference state is newly determined only if the motor vehicle has traveled a predefined minimum distance between the first and the preceding second stop operations, and/or if a predefined minimum time has elapsed, it can be ensured that the driver had the opportunity to gain a full overview of the surrounding area prior to stopping. Thus, the reference state includes only position data of objects that are known to the driver, and it may be ensured that the driver is warned of any object of which he is unaware and which is moving into the surrounding area.

That is to say, if the motor vehicle travels only a very short distance during maneuvering, no new reference state is generated in the present invention; instead, the reference state determined during the penultimate stop operation will be used. If persons move into the area surrounding the motor vehicle during maneuvering, for example, they are therefore not included as reference objects in the reference state during the renewed stop in the present invention, but the driver is warned of these persons because they are not included in the previously determined reference state.

As a result, in the exemplary embodiments and/or exemplary methods of the present invention the driver is reliably warned of objects in the surrounding area which he himself is unable to see, even if these persons are moving into the surrounding area during maneuvering in a parking space, for instance.

In the event that the motor vehicle has neither traveled the predefined minimum distance nor the predefined minimum time has elapsed, it may furthermore be provided that the reference state determined during the first stop operation is updated with the position data of the motor vehicle.

Such an updating of the reference state determined during the penultimate stop operation makes it possible to consider a relative movement between the motor vehicle and the reference objects without generating unnecessary warning signals, for example when the vehicle has moved only a few centimeters closer to an object of which the driver is aware.

The length of the predefined minimum distance may be selected such that it is at least as long as the area in the surrounding area of the motor vehicle the driver is unable to view, so that it may be ensured that a new reference state is generated only when the driver, prior to stopping, has had an opportunity to view the entire area surrounding the motor vehicle.

For example, the length of the minimum distance may be selected such that it corresponds to the length of the motor vehicle, or the minimum distance may correspond to the sum of the length of the motor vehicle and the lengths of the surrounding area in front of and behind the motor vehicle.

In one specific embodiment of the present invention, the surrounding area is monitored with the aid of object sensors mounted on the motor vehicle, the object sensors including ultrasonic sensors and/or radar sensors and/or laser sensors, and/or the object sensors analyzing video recordings of the surrounding area.

When a potential collision is detected, a warning signal may be output to the driver, this possibly being an optical, an acoustic and/or a haptic warning signal. It is also possible to output different warning signals for different situations such as different driving states (drive-off intention of the driver), different distances of the collision-endangered objects or different directions of the potential collision.

According to one further aspect, a device for collision monitoring for a motor vehicle is provided which has at least one object sensor for monitoring a surrounding area. The device is developed:

to provide a reference state for at least one first object situated in the surrounding area as reference object in a first stop operation, the reference state including reference position data of the at least one first object;

in a subsequent second stop operation, to determine whether the motor vehicle has traveled a predefined minimum distance between the first stop operation and the second stop operation, and/or whether a predefined minimum time has elapsed;

if it is determined that the motor vehicle has traveled a distance that is greater than the predefined minimum distance between the first and the second stop operation, and/or that a time that is greater than the predefined minimum time has elapsed, to update the reference state with position data of at least one second object situated in the surrounding area as reference object;

if drive-off is intended subsequently, to determine actual position data of the at least one second object as actual state; and to detect a potential collision if the actual state and the reference state indicate a distance of more than a predefined value.

In the following, a specific embodiment of the present invention is shown in exemplary form with the aid of the attached drawings.

DETAILED DESCRIPTION

Figure 1:
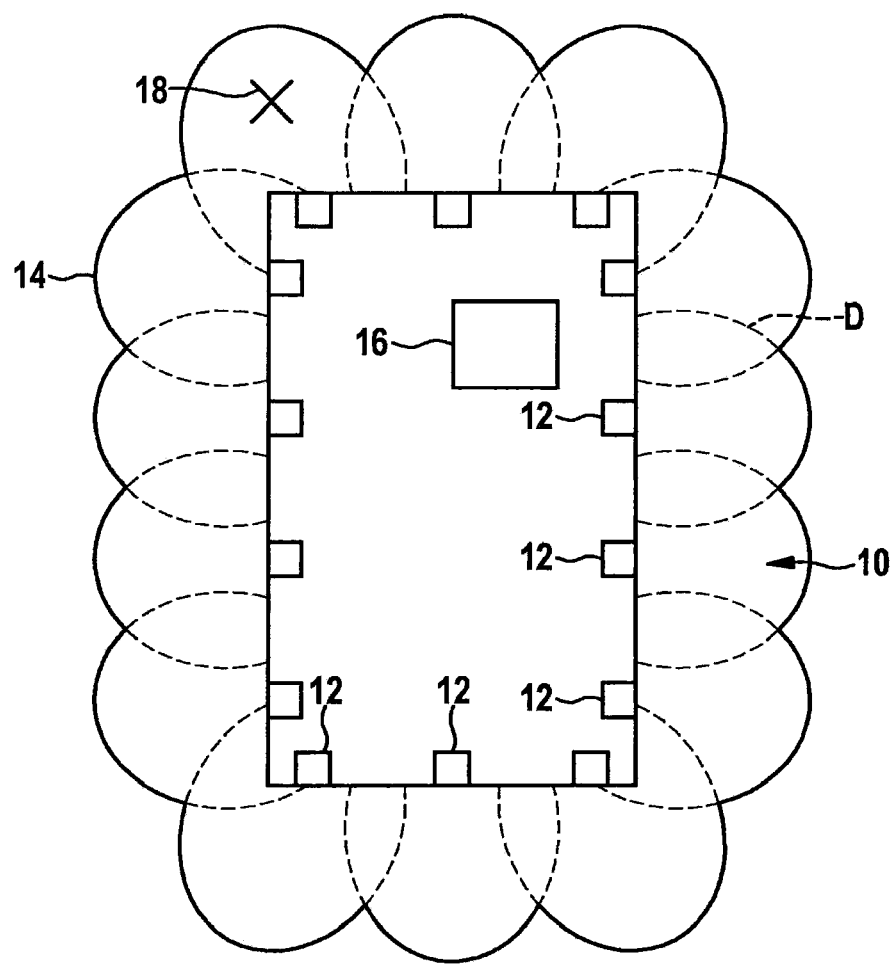
FIG. 1 shows a schematic illustration of a motor vehicle having a device for collision monitoring according to one specific development of the present invention.

As can be gathered from FIG. 1, a motor vehicle 10 is equipped with a plurality of object sensors 12, such as ultrasonic sensors, for example. Each object sensor 12 has a detection range D, as illustrated in FIG. 1 by dashed lines. The individual detection ranges D of object sensors 12 overlap in such a way that the sum of all detection ranges D covers a surrounding area 14 of motor vehicle 10.

Instead of the ultrasonic sensors, radar sensors, laser sensors or any other type of suitable object sensor may be used as well. Furthermore, it is conceivable that surrounding area 14 is monitored with the aid of one or more video camera(s), and that object sensors 12 analyze video images in order to detect objects located in surrounding area 14. Object sensors 12 are able to detect the presence of objects 18 in surrounding area 14 of motor vehicle 10, and furthermore may be designed in such a way that they are able to determine distances between the individual object 18 and motor vehicle 10 as well.

A control unit 16 is connected to object sensors 12 and determines the position of an object 18 in surrounding area 14 of motor vehicle 10 detected by object sensors 12 on the basis of the signals from object sensors 12. It is possible to determine the presence or absence of objects 18 in individual detection ranges D of object sensors 12, or to determine the distance and the direction of each object 18 from vehicle 10, or the position of each object 18 may be determined in a suitable coordinate system.

Figure 2:
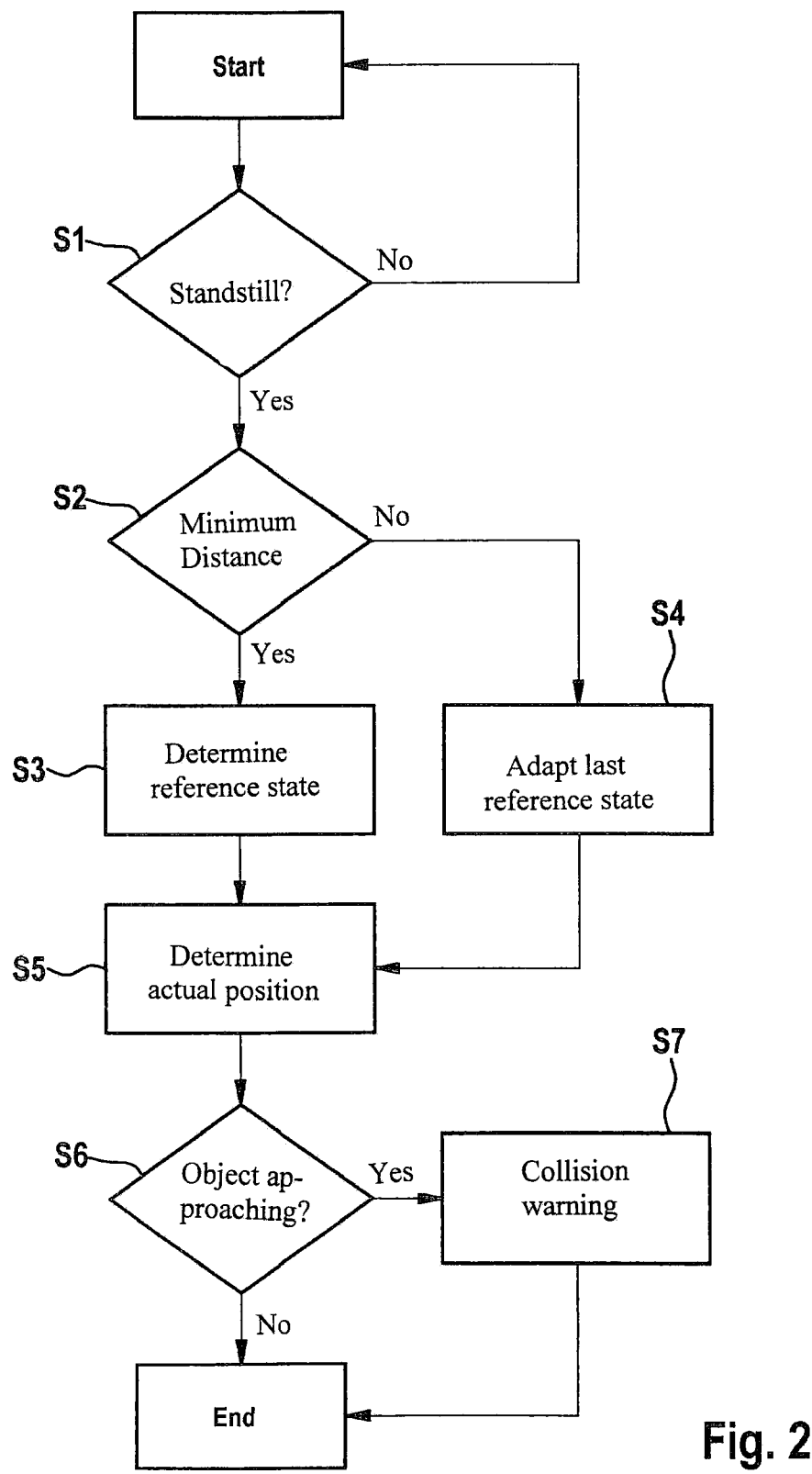
FIG. 2 shows a flow chart of a method for collision monitoring according to one specific embodiment of the present invention.

In the following text, the method of functioning of the afore-described device will be elucidated with reference to FIG. 2. The method described in the following is executed in control unit 16.

First, in step S1, it is checked whether motor vehicle 10 has stopped, i.e., whether it has reached standstill just then. Since the method according to the specific embodiment of the invention described here is implementable only during standstill of motor vehicle 10, this query is repeated until it is determined that motor vehicle 10 has come to a stop.

If motor vehicle 10 has stopped (alternative "yes" in S1), in step S2 it is checked whether a minimum distance has been traveled between the two most recent stop operations of motor vehicle 10. This may be accomplished either by determining the position of motor vehicle 10, e.g., by a GPS receiver, or alternatively, it may be checked whether motor vehicle 10 was driven for a minimum period of time between the two most recent stop operations. The minimum distance may be selected in such a way that, after traveling the minimum distance, the driver was able to obtain an overview of the entire non-viewable area in front of and behind motor vehicle 10 immediately prior to stopping motor vehicle 10.

For example, the minimum distance may amount to precisely the length of motor vehicle 10, or it may amount to the sum of the length of motor vehicle 10 and the lengths of the areas not visible to the driver in front of and behind motor vehicle 10, or it may amount to the sum of the length of motor vehicle 10 and the length of surrounding area 14, monitored by object sensors 12, in front of and behind motor vehicle 10.

The minimum time may be defined by minimum time=minimum distance (according to any one of the aforementioned definitions)/average speed of motor vehicle 10 between the two most recent stop operations, or it may be a fixedly predefined time.

If motor vehicle 10 has traveled at least the minimum distance between the two most recent stop operations (alternative "yes" in S2), a reference state of reference position data is subsequently determined in step S3. Toward this end, reference position data of one or a plurality of object(s) 18 in surrounding area 14 of motor vehicle 10 are determined with the aid of object sensors 12. Reference position data of an object 18 may include the presence of an object in a detection range D of an object sensor 12, and/or the distance of object 18 from motor vehicle 10 and/or the direction of object 18 relative to motor vehicle 10.

If it turns out that no object 18 is located in surrounding area 14 when determining the reference state, then no reference position data is able to be determined as described above. In this case, one or more previously set distance values may be used as reference position data, which, for example, are equal to the length of individual detection range D for each detection range D of object sensors 12.

If it is determined in step S2 that motor vehicle 10 has traveled a distance that is shorter than the minimum distance between the two most recent stop operations (alternative "no" in S2), the reference state determined during the most recent standstill is adopted in step S4 and adapted to the new position of motor vehicle 10.

Here, the new position of motor vehicle 10 may be determined with the aid of GPS sensors or by estimation based on the distance covered between the two most recent stop operations (based on time, speed and yaw angle determinations). The stored reference position data are able to be converted into adapted distances of reference objects 18 from vehicle 10 in its new position, the calculation using vector additions of the distance traveled by motor vehicle 10 between the two most recent stop operations. If the reference position data indicate only the presence or absence of objects 18 in the particular detection ranges D of object sensors 12, it is possible to calculate whether an object 18 should now appear in detection range D of another object sensor 12 because of the movement of motor vehicle 10.

Then, actual position data are determined in step S5. This step is implemented at predefined time intervals or in the presence of predefined events, when, for example, a drive-off intention of the driver is detected based on the position of the brake and/or accelerator pedal, and/or based on the position of the drive train of a manual or automatic transmission. In the process, the presence and/or the actual positions of objects 18 located in surrounding area 14 are/is determined. As in the determination of the reference state in step S3, here too, it is possible to determine actual position data of objects 18 in a suitable coordinate system, or to determine distance values and directional data of objects 18 from vehicle 10.

In step S6, a comparison of the actual state to the reference state is implemented in order to determine whether at least one object 18 has come closer to motor vehicle 10. This detects both the case in which an object 18 has moved toward motor vehicle 10 that was already located in surrounding area 14 of motor vehicle 10 when the reference state was determined, and also the case in which an object 18 has moved into surrounding area 14 that had not yet been located in surrounding area 14 when the reference state was determined.

If no object 18 has approached motor vehicle 10 (alternative "no" in S6), the method is terminated since no collision danger has been detected.

If it is detected in step S6 that at least one object 18 has approached motor vehicle 10 (alternative "yes" in S6), a collision danger is detected and an acoustic, optical and/or haptic warning signal is output to the driver in step S7.

The afore-described method is executed continuously and cyclically during operation of motor vehicle 10. During standstill of motor vehicle 10, it is therefore possible to determine an actual state multiple times and to compare it to the reference state.

It is conceivable to output different warning signals as a function of different driving situations of motor vehicle 10. For example, a first warning signal may be output during standstill of motor vehicle 10 if a collision danger is detected, and a second warning signal may be output if a drive-off intention of the driver is detected in addition.

What is claimed is:

1. A computer-implemented method for collision monitoring for a motor vehicle, in which a surrounding area is monitored by at least one object sensor, the method comprising:
   at least one computer processor performing the following:
      providing a reference state for at least one first object situated in the surrounding area, as a reference object in a first stop operation, the reference state including reference position data of the at least one first object;
      in a subsequent second stop operation, determining at least one of whether the motor vehicle has traveled a predefined minimum distance between the first stop operation and the second stop operation, and whether a predefined minimum time has elapsed;
      if it is determined at least one of (i) that the motor vehicle has traveled a distance that is greater than the predefined minimum distance between the first stop operation and the second stop operation, and (ii) that a time that is greater than the predefined minimum time has elapsed, updating the reference state with position data of at least one second object situated in the surrounding area, as a reference object;
      if a subsequent drive-off is intended, determining actual position data of the at least one second object as an actual state; and
      detecting a potential collision when the actual state and the reference state indicate a distance of more than a predefined value.

2. The method of claim 1, wherein, if the motor vehicle has neither traveled the predefined minimum distance nor the predefined minimum time has elapsed, the reference state determined during the first stop operation is updated with the position data of the motor vehicle.

3. The method of claim 1, wherein the length of the predefined minimum distance is selected so that it corresponds at least to a length of the region in the environment of the motor vehicle that a driver of the vehicle is unable to see.

4. The method of claim 1, wherein the predefined minimum distance corresponds to the length of the motor vehicle.

5. The method of claim 1, wherein the predefined minimum distance corresponds to the sum of the length of the motor vehicle and the lengths of the surrounding area in front of and behind the motor vehicle.

6. The method of claim 1, wherein the surrounding area is monitored with the aid of object sensors mounted on the motor vehicle, the object sensors including at least one of ultrasonic sensors, radar sensors, laser sensors, and analyzing video recordings of the surrounding area.

7. The method of claim 1, wherein a warning signal is output to a driver of the vehicle when a potential collision is detected.

8. A device for collision monitoring for a motor vehicle having at least one object sensor for monitoring a surrounding area, comprising:
   a collision monitoring device including a computer processor, wherein the processor is configured to perform the following:
      providing a reference state for at least one first object situated in the surrounding area, as a reference object in a first stop operation, the reference state including reference position data of the at least one first object;
      in a subsequent second stop operation, determining at least one of whether the motor vehicle has traveled a predefined minimum distance between the first stop operation and the second stop operation, and whether a predefined minimum time has elapsed;
      if it is determined at least one of (i) that the motor vehicle has traveled a distance that is greater than the predefined minimum distance between the first and the second stop operation, and (ii) that a time that is greater than the predefined minimum time has elapsed, updating the reference state with position data of at least one second object situated in the surrounding area, as a reference object;

if a subsequent drive-off is intended, determining actual position data of the at least one second object as an actual state; and detecting a potential collision when the actual state and the reference state indicate a distance of more than a predefined value.

9. A computer readable medium having a computer program for a control device, the computer program being executable by a processor, comprising:

a program code arrangement having program code for collision monitoring for a motor vehicle, in which a surrounding area is monitored, by performing the following:

providing a reference state for at least one first object situated in the surrounding area, as a reference object in a first stop operation, the reference state including reference position data of the at least one first object;

in a subsequent second stop operation, determining at least one of whether the motor vehicle has traveled a predefined minimum distance between the first stop operation and the second stop operation, and whether a predefined minimum time has elapsed;

if it is determined at least one of (i) that the motor vehicle has traveled a distance that is greater than the predefined minimum distance between the first stop operation and the second stop operation, and (ii) that a time that is greater than the predefined minimum time has elapsed, updating the reference state with position data of at least one second object situated in the surrounding area, as a reference object;

if a subsequent drive-off is intended, determining actual position data of the at least one second object as an actual state; and detecting a potential collision when the actual state and the reference state indicate a distance of more than a predefined value.

* * * * *